United States Patent

[11] 3,587,399

[72] Inventors Donald James Parquet
Dike;
Daniel Luce Hall, Waterloo; Stanley Martin Gregerson, Cedar Falls, Iowa
[21] Appl. No. 821,350
[22] Filed May 2, 1969
[45] Patented June 28, 1971
[73] Assignee Deere & Company, Moline, Ill.

[54] CONTROL VALVE MEANS FOR A TWO-WAY HYDRAULIC CYLINDER
6 Claims, 2 Drawing Figs.

[52] U.S. Cl. ................................................ 91/420
[51] Int. Cl. ........................................... F15b 11/05, F15b 13/042
[50] Field of Search ........................................ 91/420, 402, 449; 92/80, 86, 75

[56] References Cited
UNITED STATES PATENTS
3,274,902  9/1966  Kleckner ................ 91/420

*Primary Examiner*—Martin P. Schwadron
*Assistant Examiner*—Allen M. Ostrager
*Attorneys*—H. Vincent Harsha, Harold M. Knoth, William A. Murray, John M. Nolan and Jimmie R. Oaks ABSTRACT: A control valve for a two-way hydraulic cylinder includes a pressure-compensated flow control valve for maintaining a constant predetermined flow rate to the hydraulic cylinder and has a pair of check valves for preventing the return of fluid from the ends of the hydraulic cylinder, a pair of opposed hydraulically operated pistons responsive to fluid pressure between their faces for respectively engaging and unseating the check valves and a manually operated spool-type direction control valve for selectively connecting the outlets of the pressure-compensated valve to one or the other of the ends of the hydraulic cylinder and to the faces of the opposed pistons.

PATENTED JUN28 1971

3,587,399

INVENTORS
D. J. PARQUET, D. L. HALL &
S. M. GREGERSON 3,587,399

1

CONTROL VALVE MEANS FOR A TWO-WAY HYDRAULIC CYLINDER

BACKGROUND OF THE INVENTION

This invention relates to an improved valve means for controlling a reversible pressure-actuated motor and more specifically relates to an improvement over the subject matter of U.S. Pat. No. 3,274,902 granted to Richard M. Kleckner on Sept. 27, 1966.

The known uses of spool-type direction control valves to operate two-way hydraulic cylinders entails the problem of leakage of the valve lands which causes the cylinder to creep or settle.

The above-noted Kleckner design partially overcomes this problem by the use of check valves but still has the problem that leakage from the pressure source occurs across the lands and causes opening of the check valves before the pressure to the cylinder is sufficient to operate the cylinder, and the cylinder then settles until the operating pressure becomes sufficient. This problem occurs because the circuit for pressurizing the hydraulically operated piston means for unseating the check valves is interconnected with the work passages leading to the opposite ends of the cylinder.

SUMMARY OF THE INVENTION

The present invention provides an improved pilot-operated check valve assembly for use in a hydraulic system for controlling a two-way hydraulic cylinder and more specifically, features a check valve assembly which bleeds off high-pressure leakage from a spool-type direction control valve to the reservoir so that the leakage does not affect the operation of the hydraulic cylinder.

A further object is to provide, for operating the check valve unseating means, a pressure supply passage separate from the passages for supplying fluid to the opposite ends of the cylinder and containing a check valve for preventing the return of flow from the unseating means.

Another object is to provide a pair of opposed pistons stepped down in diameter from their faces so that they will move to positively unseat the check valves.

Still a further object is to provide conduits in the pistons for joining the work passages for the cylinder to the supply passage for the operation of the pistons and to provide check valves in the conduits for preventing flow from the supply passage when the supply passage is pressurized while allowing flow from the work passages to the supply passage when the supply passage is connected to the reservoir.

These and other objects will become apparent from the following detailed description and accompanying drawings.

DESCRIPTION OF THE PREFERRED EMBODIMENT

Figures 1, 2:
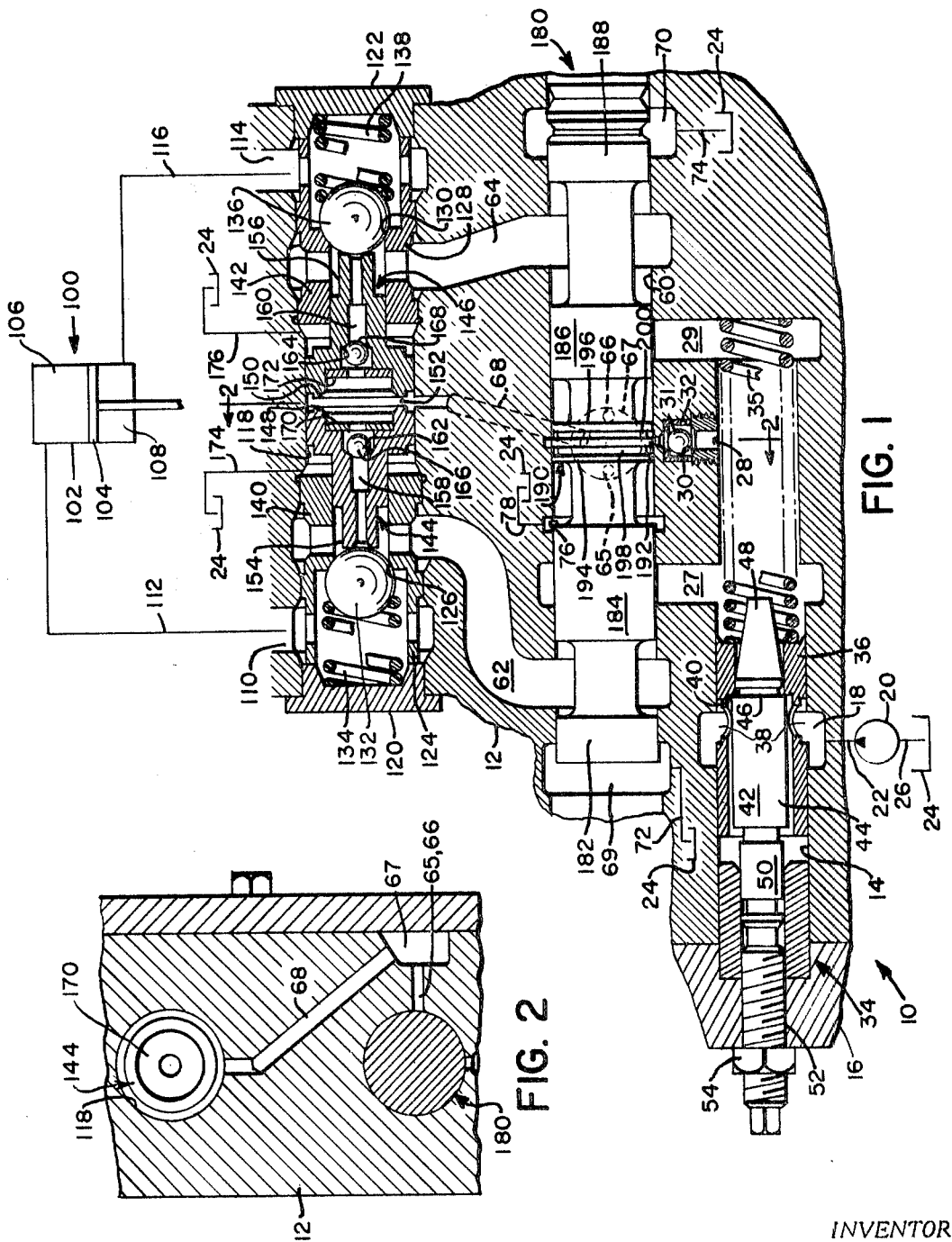
FIG. 1 is a combined sectional and schematic view of the hydraulic system in a neutral condition.
FIG. 2 is a sectional taken along line 2-2 of FIG. 1.

The system includes a control valve assembly 10 having a valve body 12 provided with a cylindrical bore 14 closed at its left end by a member 16. The bore 14 has an inlet port 18 connected to a source of fluid under pressure 20 via a conduit 22 from a reservoir 24 via a conduit 26. The bore 14 has three supply passages 27, 28 and 29. A valve seat 30 in the passage 28 has a spherical check valve 31 in a retainer cage 32 adjacent to the seat and allows flow from only the bore 14.

A pressure-compensated flow control valve 34 in the bore 14 maintains a constant preselected flow between the inlet port 18 and passage 27 or 28. The pressure-compensated valve 34 includes a compression spring 35 which acts between the right end of the bore 14 and a tubular or sleevelike regulating valve member 36. The valve member 36 extends across the inlet 18 and contains a plurality of radial metering ports 38

2 positioned to receive flow from the inlet 18, and the valve has an interior annular shoulder 40 slightly downstream from the ports 38. A flow control valve member 42 concentrically positioned within the regulating valve 36 includes a cylindrical portion 44 which terminates in a shoulder 46 opposed to and forming a seat for the shoulder 40. A tapered end portion 48 extends from the shoulder 46 and a stem 50 having a threaded portion 52 extends through the bore closure member 16 to provide means for adjusting the flow control valve 42, being held in adjusted position by a lock nut 54.

A bore 60 intersects the supply ports 27, 28 and 29 as well as a pair of work passages 62 and 64 and a pair of small passages 65 and 66 adjacent to and on opposite sides of the inlet passage 28 and opening into a cavity 67 which is in turn connected to a passage 68. A pair of passages 69 and 70 respectively at the left- and right-hand ends of the bore 60 lead to the reservoir 24 via conduits 72 and 74. A further passage 76 to the left of the inlet passage 28 is connected to the reservoir at 78.

A reversible hydraulic motor 100, here shown as a double-acting hydraulic cylinder or ram, includes a cylinder 102 and a piston 104 movable between the opposite cylinder ends 106 and 108 that are connected respectively to first and second motor outlet passages 110 and 114 by conduits 112 and 116.

The motor outlet passages 110 and 114 are intersected by a cylindrical bore 118 in the body 12 and closed at opposite ends by caps 120 and 122, respectively. The work passages 62 and 64 intersect the bore 118 adjacent to the respective motor passages 110 and 114. A first valve seat 124 having an axial opening 126 is mounted in the bore 118 between the first motor outlet passage 110 and the work passage 62, and a second valve seat 128 having an axial opening 130 is mounted in the bore 118 between the second motor outlet passage 114 and the work passage 64. The first motor outlet passage 110, the work passage 62 and the valve seat 124 form a first passage means or conduit means through the body 12 closable by a spherical check valve 132 biased against a valve seat 124 over the opening 126 by a spring 134 for preventing the return of fluid from the motor outlet passage 110 to the work passage 62. Similarly, the second motor outlet passage 114, the work passage 64, and the valve seat 128 form a second passage closable by a check valve 136 biased against the valve seat 128 over the opening 130 by a spring 138 for preventing the return of fluid from the second motor outlet passage 114 to the work passage 64.

The bore 118 carries a pair of centrally bored cylindrical members 140 and 142 adjacent to the passage 62 and 64 respectively. A pair of pistons 144 and 146 are slidable in the bore 118 between the check valves 132 and 136, the pistons having opposite radial faces 148 and 150 recessed to form a chamber 152 which is exposed to the passage 68. The pistons have axial shaft portions 154 and 156 which are reduced in diameter from the faces 148 and 150 and which extend through the cylindrical members 140 and 142 respectively and have axial conduits 158 and 160 which respectively connect the chamber 152 to the first and second passage means. Valve seats 162 and 164 are respectively located in the conduits 158 and 160, and spherical check valves 166 and 168 respectively seat on the seats 162 and 164 to allow flow only from the first and second passage means to the chamber 152. The check valves 166 and 168 are held adjacent to the respective seat by retainer washers 170 and 172 respectively. The shaft portions 154 and 156 respectively engage and unseat the check valves 132 and 136 when the chamber 82 is pressurized enough to overcome the fluid pressure and spring forces exerted on the check valves. To ensure free movement of the pistons, the space between the pistons 144 and 146 and the associated cylindrical members 140 and 142 is connected to the reservoir via passages 174 and 176 respectively.

A manually actuated direction control valve 180 is shiftable in the bore 60 for selectively connecting the work passages 62 and 64 to the supply passages 27 and 29 respectively or to the reservoir-connected passages 69 and 70 respectively. The control valve 180 also selectively connects the passages 65 and 66 and the associated cavity 67 and passage 68 to the supply passage 28 or to the reservoir-connected passage 76 and has lands 182 and 184 at the left-hand end on opposite sides of the work passage 62, the land 184 blocking the supply passage 27, and lands 186 and 188 at the right-hand end on opposite sides of the work passage 64, the land 186 blocking the supply passage 29. The control valve 180 has a land 190 intermediate its ends which has a first relatively narrow land portion 192 centered over the inlet of the supply passage 28 and second and third relatively narrow land portions 194 and 196 respectively between the supply passage 28 and the passages 65 and 66. The land 190 has a pair of annular grooves 198 and 200 separating the land portions 192, 194 and 196.

In operation, assuming the control valve 180 is in the neutral position illustrated, the regulating valve member 36 will be in the position illustrated and only flow due to leakage across the lands of the valve 180 will occur through the valve member 36. In its neutral position, the control valve 180 blocks the supply conduits 27, 28 and 29 and connects the chamber 152 and the associated passage 68 to the reservoir 24 via the cavity 67, the passage 65, and the passage 76. Since there is no pressure in the chamber 152, the shaft portions of the pistons 154 and 156 will not be tightly seated against the check balls 132 and 136 and the check valves 166 and 168 in the shaft portions of the pistons will be free to shift away from their respective seats 162 and 164 thus permitting fluid under pressure in the work passages 62 and 64 to flow through the conduits 158 and 160 into the chamber 152 and then to the fluid reservoir 24 in the manner described above. The connection of the work passages 62 and 64 to the reservoir when the control valve is in the neutral position is important, since any high-pressure leakage which might occur between the supply passages 27 and 29 and the associated work passages 62 and 64, across the respective lands 184 and 186, will be directed to the reservoir instead of causing the check valves 132 and 136 to open. This pressure leakage would normally be insufficient to operate the piston 104 and the opening of the check valves would permit the piston 104 to settle under its load.

When the control valve 180 is moved to the left from the neutral position, the supply passage 27 remains blocked, the work passage 62 is connected to reservoir via passages 69 and 72, the work passage 64 is connected to the supply passage 29 and the supply passage 28 is connected to the chamber 152 via the passage 66, the cavity 67 and the passage 68, the flow into the passage 28 unseating the check valve 31. It is to be noted that the land 190 blocks off the passage 65 prior to uncovering the supply port 28 so that a proper operating sequence is maintained. The chamber 152 is thus blocked from the reservoir and becomes pressurized with the result that the check valves 166 and 168 become seated and the pistons 144 and 146 separate to positively unseat the check valves 132 and 136 respectively, allowing exhaust of fluid from the end 106 of the cylinder via the passages 112, 110, opening 126 and work passage 62 and permitting fluid under pressure from the passage 64 to enter the bottom end 108 of the cylinder via the opening 130 and the passages 114 and 116. When the pistons 144 and 146 are separated and the check valves 132 and 136 are open as described above, flow of fluid into the supply passage 28 ceases and the check valve 31 will reseat and prevent the escape of fluid from the chamber 152 if a drop in pressure occurs at the supply passage 28 or if the pressure in the chamber 152 increases due to a pressure increase at the supply passage 64. Thus, the check valve 31 seats during pressure fluctuations in the system to maintain sufficient pressure in the chamber 152 to keep the pistons 144 and 146 separated against the check balls 132 and 136 to prevent their intermittent seating and unseating.

It will be appreciated that when the control valve 180 is shifted to the right from neutral, a similar condition is obtained. The supply passage 27 is connected to the work passage 62 and the work passage 64 is connected to the reservoir via passages 70 and 74. The land 186 opens the supply passage 29; however, the space between lands 194 and 186 prevents further flow. The flow from the supply passage 28 unseats the valve 31 and enters the chamber 152 via passage 65, the cavity 67 and the passage 68. The pressure in the chamber 152 again causes the pistons to separate and open the check valves 132 and 136 and the top end 106 of the cylinder is pressurized while the bottom end 108 is exhausted.

By moving the control valve 180 to its extreme right position, a "float" condition of the system is obtained wherein the work passages 62 and 64 are connected to the reservoir respectively via the passages 69 and 72 and the passages 70 and 74. The flow from the supply passages 27 and 29 is blocked between the respective lands 182 and 184 and lands 186 and 196. The supply passage 28 is connected to the chamber 152 via the passage 65, the cavity 67 and the passage 68 and the pressure in the chamber 152 separates the pistons 144 and 146 to unseat the check valves 132 and 136 and connect the opposite ends of the motor 100 to the reservoir-connected work passages 62 and 64.

We claim:

1. A hydraulic system comprising: a source of fluid pressure having an associated reservoir, a reversible hydraulic motor having alternate inlets, a first and second conduit means respectively communicating with said alternate inlets; a third conduit means, control valve means operably connected to the pressure source, reservoir and first, second and third conduit means for establishing, selectively, a neutral condition wherein all three conduit means are connected to the reservoir, a first active condition wherein the first and third conduit means are each separately connected to the source and the second conduit means is connected to the reservoir, and a second active condition wherein the second and third conduit means are each separately connected to the source and the first conduit means is connected to the reservoir; first and second check valves respectively mounted in the first and second conduit means between the control valve means and the motor and biased against the return of fluid from the motor, hydraulic means connected to said third conduit means and actuated by fluid pressure therein to operably engage and unseat said first and second check valves and a third check valve mounted in said third conduit means between the source of fluid pressure and the control valve for preventing the return of fluid from the hydraulic means.

2. The invention defined in claim 1 wherein said hydraulic means includes passage means for connecting said firs and second conduit means to the reservoir, and valve means associated with said passage means allowing flow to the reservoir when the control valve means is in the neutral condition and blocking flow to the reservoir when the control valve is in an active condition.

3. The invention defined in claim 1 wherein said hydraulic means includes a bore between the first and second check valves joining said first and second conduit means, a pair of pistons having opposed faces mounted in said bore for movement in response to fluid pressure in the bore to respectively engage and unseat said first and second check valves and the third conduit means being connected to the bore between the piston faces.

4. The invention defined in claim 3 wherein the pistons each have an axial conduit joining the first and second conduit means with the third conduit means and a check valve mounted in each of said axial conduits for preventing flow from the third conduit means to the first and second conduit means.

5. The invention defined in claim 3 wherein the ends of the pistons which engage the check valves are reduced in diameter from the faces which are exposed to the fluid pressure in the third conduit means whereby the pistons will separate to positively unseat the check valve even if fluid under pressure is exerting a force on the check valve engaging end.

6. The invention defined in claim 1 wherein the control valve means is a spool valve having an associated bore intersecting said first, second and third fluid passage means and wherein said third passage means includes a fluid cavity radially spaced from said spool valve, a pair of conduits connecting the fluid cavity to the bore in such relationship to the valve lands that one of said conduits is connected to the reservoir when the spool valve is in the neutral condition and one of said conduits is connected to the source when the spool valve is in an active condition.